United States Patent [19]
Nilsson

[11] 3,958,845
[45] May 25, 1976

[54] TIGHTENING OF BALL BUSHES
[75] Inventor: Sven Walter Nilsson, Partille, Sweden
[73] Assignee: SKF Nova A.B., Goteborg, Sweden
[22] Filed: Nov. 14, 1974
[21] Appl. No.: 523,756

[30] Foreign Application Priority Data
Nov. 22, 1973 Sweden.............................. 7315787

[52] U.S. Cl................................... 308/65; 308/31; 308/189 R
[51] Int. Cl.²........................................ F16C 25/00
[58] Field of Search ................. 308/65, 31, 32, 189, 308/197, 196, 237 A

[56] References Cited
UNITED STATES PATENTS

| | | | |
|---|---|---|---|
| 2,604,366 | 7/1952 | Morgan et al. | 308/65 |
| 2,676,068 | 4/1954 | Lincke | 308/65 |
| 3,488,791 | 1/1970 | Wadsworth et al. | 308/31 |

FOREIGN PATENTS OR APPLICATIONS

| | | | |
|---|---|---|---|
| 516,749 | 3/1970 | Switzerland | 308/65 |

Primary Examiner—Robert R. Song
Assistant Examiner—Richard A. Bertsch
Attorney, Agent, or Firm—Daniel M. Rosen

[57] ABSTRACT

A ball bush unit, comprising a number of ball races with balls, a holder for the balls and a casing surrounding essentially the holder and the balls, the casing and the holder showing a longitudinal slot, with the characteristic that for tightening the bush against the axle an arched washer provided with a screw is arranged on at least one side of the slot.

5 Claims, 1 Drawing Figure

U.S. Patent May 25, 1976 3,958,845
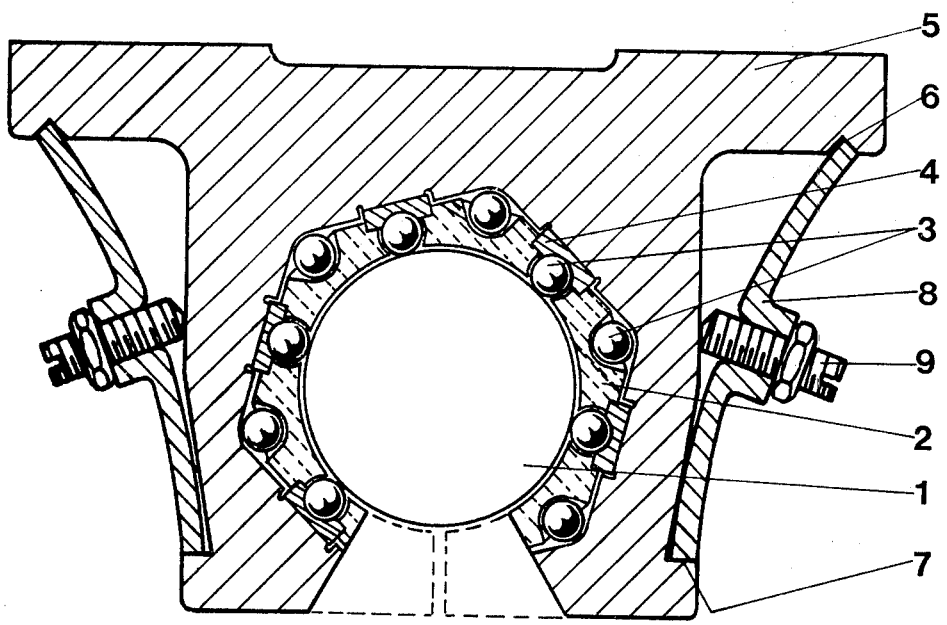

TIGHTENING OF BALL BUSHES

The present invention relates to ball bushes and in particular to a device for tightening such a bush on an axle.

Ball bushes are already known. They are applied in various machines where a linear movement of a machine element is desired. The axle, on which the bush runs, can be supported at the ends or on part of its length or its whole length. In the latter case it is therefore necessary to use a ball bush having a longitudinal slit, so that the bush can pass the support of the axle.

A slitted ball bush can easily be tightened insufficiently to the axle, but, of course, the same requirements of tightening have to be made for such a bush as for a non slitted bush. Therefore it is of importance that the bush is tightened in such a way that no unevenness in the collaring pressure can arise. With solutions which were known before, with one or more screws pressing the upper part of the bush against the axle, such unevenness resulted.

An object of the present invention is to provide a simple tightening device which gives a uniform tightening as desired. This has been obtained by providing, at least on one side of the longitudinal slit, an arched washer provided with a screw.

A tightening device according to the invention can be applied to various types of slitted bushes, but they are especially very suitable for those in which the parts of the ball race which absorb the load, are arranged directly in the casing or in longitudinal rails inserted in it.

The invention is described more in detail in the following text with reference to the annexed drawing, which is a cross-sectional view of a slitted ball bush in section together with tightening device.

The FIGURE shows an axle 1 a slitted bush holder 2 with balls 3 and rails 4 for bearing balls. The slitted casing of the bush 5, which is usually extruded, usually consists of aluminium as a basic material. In the casing 5 there are two longitudinally extending grooves 6 and 7. In these grooves an arched washer 8 has been arranged, in which a screw 9 is threaded. By screwing the screw 9 against the casing of the bush, the arched washer is bent outwards and the lower leg shown in the drawing presses the lower part of the casing inwards against the slit. In this way tightening of the bush against the axle is effected. If, as usually is the case, the bush is of the same thickness on both sides of the slot, then a tightening washer can be used on both sides of the slot. In this way the lower part of the casing 5 is pressed against the axle along a line or surface, instead of at some points only, as it was the case with devices known before. Consequently a very uniform and good tightening is effected. The material in the arched washer can be steel, but other material with spring properties can be used as well.

The lower slits in the bush holder 2 and the casing 5, shown in the drawings, enable the bush to be moved axially with respect to the axle 1 past suitable lower supports (not shown) provided for supporting the axle. If such supports are not employed, the slits of these members may be narrower, as indicated in dashed lines.

The invention is not limited to the example shown but can be modified within the frame work of the claims.

What is claimed is:

1. A ball bush unit of a type having a number of races and adapted to move linearly on an axle, comprising a holder having an axially extending slit and adapted to partially surround said axle, a casing surrounding said holder and having a slit lined with the slit of said holder, a plurality of balls between said holder and said axle, and between said holder and said casing, and means for tightening said bush unit on the axle comprising an arched washer mounted externally on said casing and spaced from one side of the slit of said casing, with opposite edges of said washer engaging said casing, and a screw threaded in said washer and adapted to engage a side of said casing, said screw pressing inwardly against said casing with respect to said axle, thereby reducing the arch of said arched washer and narrowing the gap of said slit, whereby said slit of said casing is not externally covered by said washer.

2. The ball bush unit of claim 1, wherein the load absorbing parts of the ball races are arranged directly in said casing.

3. The ball bush unit of claim 1, further comprising a plurality of longitudinal rails in said bushing, at least a portion of said balls engaging said rails.

4. The ball bush unit of claim 1, wherein said casing has a plurality of external longitudinally extending grooves, said washer being arranged with one edge in one of said grooves and an opposite edge in another of said grooves, whereby said screw engages a side of said casing.

5. The ball bush unit of claim 1, wherein said casing has a pair of spaced apart longitudinally extending grooves on each side of the slit therein, said washer being held in one pair of said grooves, and further comprising a second washer arranged in the other pair of grooves, and a screw threaded in said other washer for engaging the side of said casing, whereby screwing of said screws in the respective washers presses the opposite sides of said casing, pressing the portion of said casing on opposite sides of said split inwardly toward said axle.

* * * * *